United States Patent [19]

Pradel

[11] Patent Number: 5,632,471
[45] Date of Patent: May 27, 1997

[54] AIR SUSPENSION SYSTEM OF A MOTOR VEHICLE WITH AIR SHOCKS OR AIR SPRING WITH A COMPRESSED AIR CONTAINER IN THE AIR SUSPENSION SYSTEM

[75] Inventor: Robert Pradel, Heidenfeld, Germany

[73] Assignee: Fichtel & Sachs AG, Schweinfurt, Germany

[21] Appl. No.: 509,105

[22] Filed: Aug. 1, 1995

[30] Foreign Application Priority Data

Aug. 2, 1994 [DE] Germany ............... 44 27 235.9
Mar. 11, 1995 [DE] Germany ............... 195 08 854.9

[51] Int. Cl.$^6$ ............. B60G 17/00; B60G 17/08; B60G 21/10
[52] U.S. Cl. ............. 267/64.11; 267/64.24; 267/64.27; 267/122; 267/35; 280/711; 188/322.19
[58] Field of Search ............... 267/64.11–64.28, 267/122, DIG. 1, DIG. 2, 186, 187, 34, 35; 188/322.19; 280/782, 711, 662, 668, 672; 105/4.2, 4.4, 159; 180/89.12

[56] References Cited

U.S. PATENT DOCUMENTS

| | | | |
|---|---|---|---|
| 2,882,068 | 4/1959 | Faiver | 280/711 |
| 2,901,242 | 8/1959 | Elliott et al. | 267/64.24 |
| 2,945,701 | 7/1960 | Dietrich et al. | 267/DIG. 1 |
| 3,053,528 | 9/1962 | Stengelin | 267/64.24 |
| 4,624,476 | 11/1986 | Tanaka et al. | 280/711 |
| 4,753,174 | 6/1988 | Berg et al. | 303/85 |
| 4,799,707 | 1/1989 | Buma et al. | 280/711 |
| 4,834,418 | 5/1989 | Buma et al. | 280/711 |
| 4,871,189 | 10/1989 | Van Breemen | 180/89.12 |
| 5,135,203 | 8/1992 | Wijnhoven et al. | 267/64.24 |

FOREIGN PATENT DOCUMENTS

| | | |
|---|---|---|
| 1164251 | 2/1964 | Germany. |
| 1275882 | 8/1968 | Germany. |
| 3609396 | 10/1986 | Germany. |
| 3909916 | 9/1990 | Germany. |

*Primary Examiner*—Douglas C. Butler
*Attorney, Agent, or Firm*—Nils H. Ljungman and Associates

[57] ABSTRACT

Air suspension system with a compressed air container of an air suspension system for a motor vehicle with a vehicle frame and a vehicle body, comprising a number of elastic air springs which are connected to the reservoir, whereby the air springs and the reservoir are to be considered as compressed air containers, characterized by the fact that at least one compressed air container is located inside a cavity formed by at least one vehicle part which is independent of the air suspension system strictly speaking.

20 Claims, 16 Drawing Sheets

AIR SUSPENSION SYSTEM OF A MOTOR VEHICLE WITH AIR SHOCKS OR AIR SPRING WITH A COMPRESSED AIR CONTAINER IN THE AIR SUSPENSION SYSTEM

BACKGROUND OF THE INVENTION

1. Field of the Invention

This invention relates to an air suspension system of a motor vehicle with air shocks or air springs with a compressed air container for a vehicle with a vehicle frame and a vehicle superstructure, comprising a number of elastic air springs which are connected to the reservoir, whereby the air springs and the reservoir are to be considered compressed air containers.

2. Background Information

Such an air suspension system is disclosed, for example, in German Patent No. 36 09 396. The supplemental volume or the compressed air container for the air springs corresponding to the wheels is located in a container which has a very massive construction, like that which is customarily used in trucks and other utility vehicles. Although in utility vehicles, there is a sufficient amount of space available to install such a system, space is at considerably more of a premium in passenger vehicles. The small spaces which are available, e.g. in the engine compartment, leave barely enough room even for the installation of an air reservoir. The wheel wells are already occupied by the shock absorbers and tires with wide treads which are increasingly common. But a compressed air container is essential for the operation of an air suspension system. Supplemental reservoirs, as disclosed in a number of publications, make it possible to advantageously affect the suspension rate or to minimize the pump output, so that the use of a supplemental reservoir is desirable, in spite of the space problems it entails, as indicated above.

OBJECT OF THE INVENTION

The object of the invention, for at least one compressed air reservoir or supplemental reservoir, is to solve the space problems encountered in similar known systems.

SUMMARY OF THE INVENTION

The invention teaches that the above object can be accomplished, in accordance with at least one preferred embodiment, if the compressed air container is located inside a cavity formed by at least one vehicle part which, strictly speaking, is preferably independent of the air suspension system. In every vehicle, there are numerous cavities which are currently not used at all. The space available, which is already tight, is not further reduced as a result of the use of these cavities for the compressed air container(s).

It has been found to be particularly advantageous if the independent vehicle part is a hollow body of a vehicle body. The vehicle body offers a number of usable cavities, e.g. the A-pillars or the doorsills. Many such cavities in a vehicle are currently filled with foam or must be sealed at great expense, so that no moisture can penetrate inside them. This expense is no longer necessary, since the compressed air container fills up the cavity. For example, the dome of a wheel well can be advantageously used as the hollow body, and when air springs are used, the spring volume can be increased.

As a rule, the cavities can be full of fissures and indentations and have very complex shapes. So that the maximum volume of these cavities can be utilized, the reservoir is preferably formed by a flexible envelope which, when filled, is in contact with the wall(s) of the cavity. The shape of the compressed air container essentially no longer plays any role at all. Essentially, all that is important is that the vehicle parts which form the cavity have sufficient strength to withstand the operating pressures of the compressed air container. In this case, the vehicle body offers the advantage of high strength resulting from its shape and design.

Alternatively, the volume of the flexible envelope can also be smaller than the volume of the cavity. In that case, the envelope itself must be capable of withstanding the operating pressure.

As disclosed in an advantageous subclaim, the flexible envelope has an air connection which is in contact against the wall of the cavity. The air connection is thereby more effectively protected against harmful external influences.

For safety purposes, the flexible envelope is realized as a multi-layered structure. Therefore any sharp edges which may be present inside the cavity cannot cause any damage which might result in a loss of pressure.

The invention teaches that at least one part of the wall which forms the cavity is advantageously realized so that it can be moved in relation to the rest of the wall. A greater or lesser amount of pressure can therefore be exerted on the envelope, so that it becomes possible to control the suspension rate of the air springs. The movable part is thereby formed by a plate which can be displaced axially. In an additional advantageous embodiment, the plate has a drive mechanism to control the volume which provides the suspension. It is thus possible to use a one-time connection tube to fill the envelope with compressed air. After the air spring or the compressed air container has been filled once, the air connection tube can be welded shut, since the further control of the suspension rate is accomplished not by introducing and discharging compressed air, but by changing the volume of the envelope.

In one advantageous embodiment, the body part is realized in the form of a frame crossmember. For example, there are already individual frame crossmembers which provide support for the rear seat. A crossmember as claimed by the invention therefore becomes a multi-function component.

In an additional configuration, the crossmember has a partition which divides the compressed air container in a sealed manner into two individual reservoirs. The partition can very easily be formed by an inserted disc body. In one particularly advantageous variant, the crossmember has two partitions which divide the compressed air container in a sealed manner, forming a main reservoir and two supplemental reservoirs. The partitions between the supplemental reservoirs and the main reservoir can thereby have switchable connecting valves. Connections and lines between the main reservoir and the supplemental reservoirs are advantageously eliminated or bypassed, to prevent leaks.

The installation of a compressed air container inside a cavity is relatively simple. In a first step of the process, the envelope of the compressed air container is introduced into the cavity through an opening. Then the envelope is filled with a gas medium and the opening is closed, except for a passage for the connection to the air springs. The closed configuration of the cavity is designed to prevent blisters, similar to those which can occur in another context on a damaged soccer ball.

For cavities in which access is particularly difficult, the envelope is folded flat and is connected to a flexible installation rod, and is then introduced into the opening by means of the installation rod.

For larger openings, the opening is closed by a cover which is located inside the cavity, the closing force on which is provided by the pressure inside the compressed air container. In such cases, the introduction of the envelope is particularly easy.

BRIEF DESCRIPTION OF THE DRAWINGS

The invention is explained below in greater detail, with reference to the accompanying figures.

DESCRIPTION OF THE PREFERRED EMBODIMENT

Figure 1:
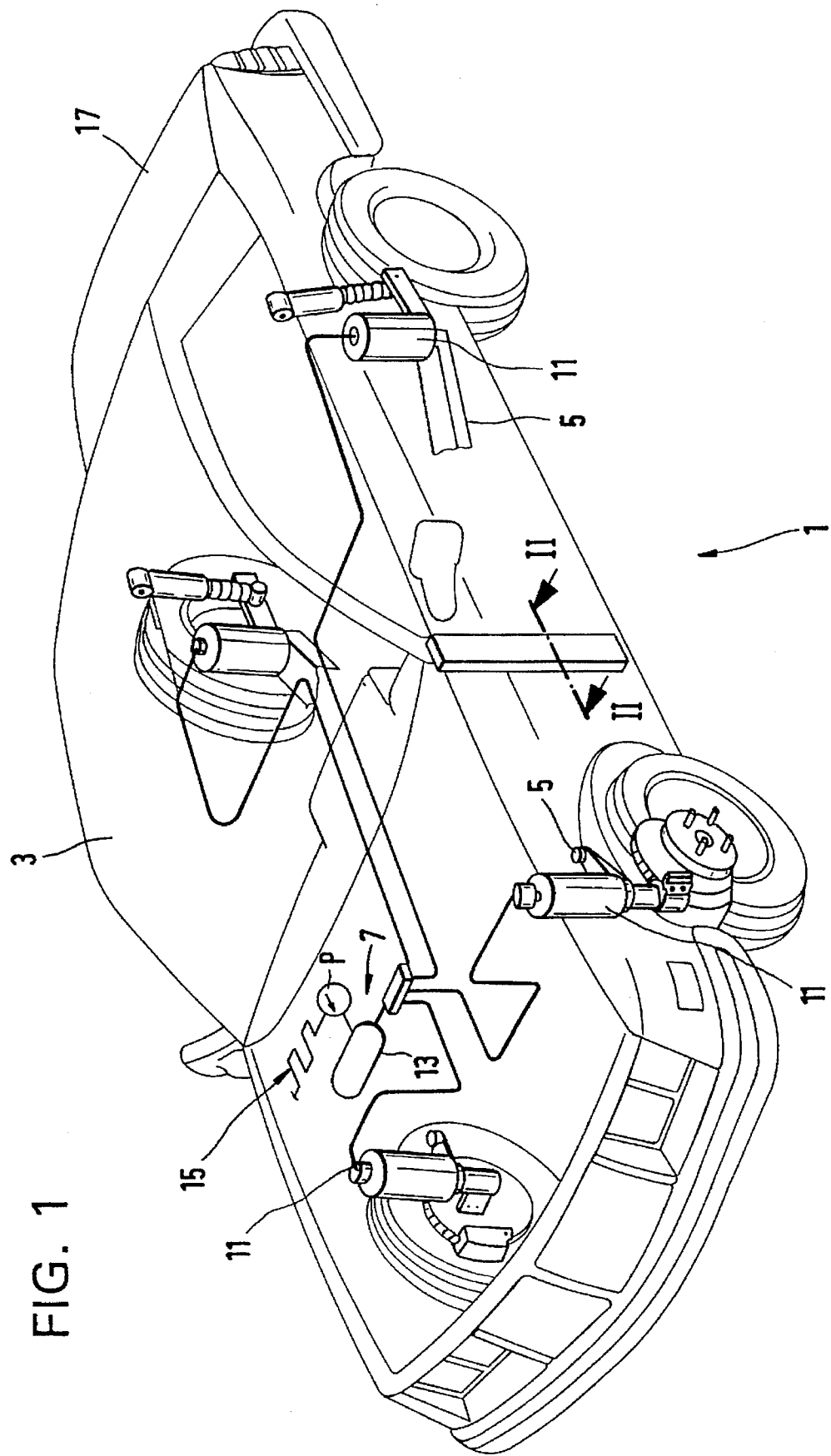
FIG. 1 is an overall illustration of an air suspension system in a motor vehicle.

FIG. 1 shows a motor vehicle 1 which includes a vehicle body 3 and a vehicle frame 5. The frame 5 comprises an air suspension system 7 for the frame 5 and axle parts 3. The air suspension system 7 includes air springs 11 which are assigned to the wheels of the vehicle frame 5. The air springs 11 are preferably connected to a compressed air container 13 and to a pump 15 which is used to fill the compressed air container. Various valves preferably control the connection between the air springs and the compressed air container, but these valves are not shown in the drawing, for the sake of simplicity.

The vehicle bodywork can include, among other things, a body 17 which includes individual, largely two-dimensional parts, but also includes hollow bodies. In particular, the passenger compartment and many of the load-bearing parts of the body are essentially formed by hollow bodies.

Figure 1A:
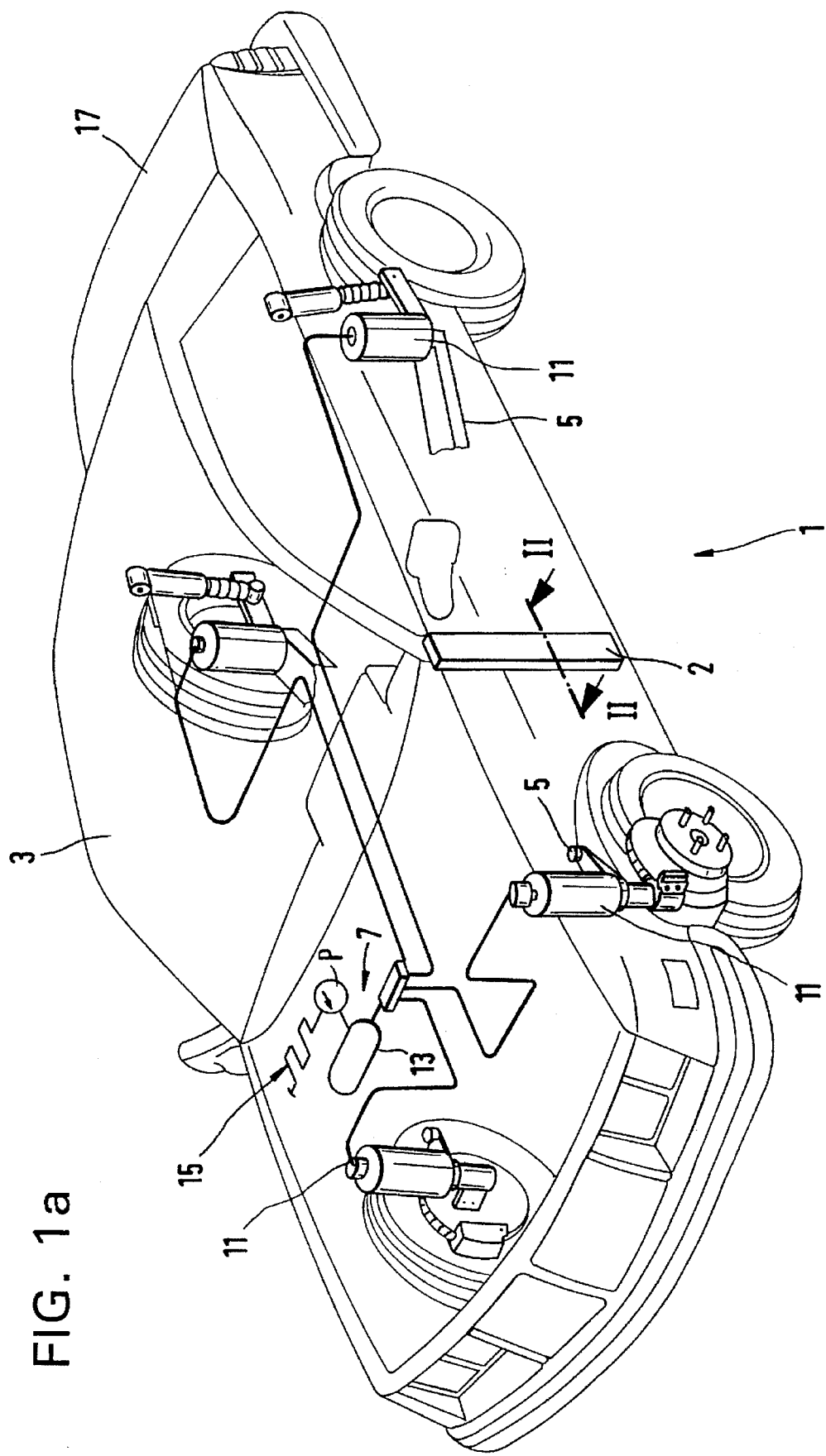
FIG. 1a is essentially the same view as FIG. 1, but more detailed.

FIG. 1a is essentially the same view as FIG. 1, but more detailed. Particularly, FIG. 1a specifically designates what may be considered to be a so-called "A-pillar" 2 that may be utilized in accordance with the embodiments of the present invention. It will be understood, then, that in accordance with a preferred embodiment of the present invention, the two views of FIG. 2 may be considered to be alternative cross-sections taken along line II—II of FIG. 1a.

Figure 2:
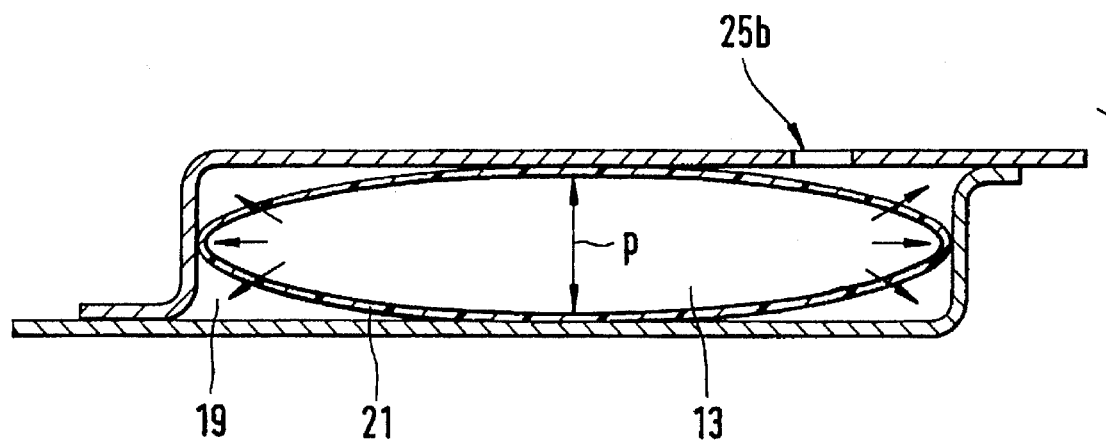
FIG. 2 is a sectional view of the hollow body.
Figure 2:
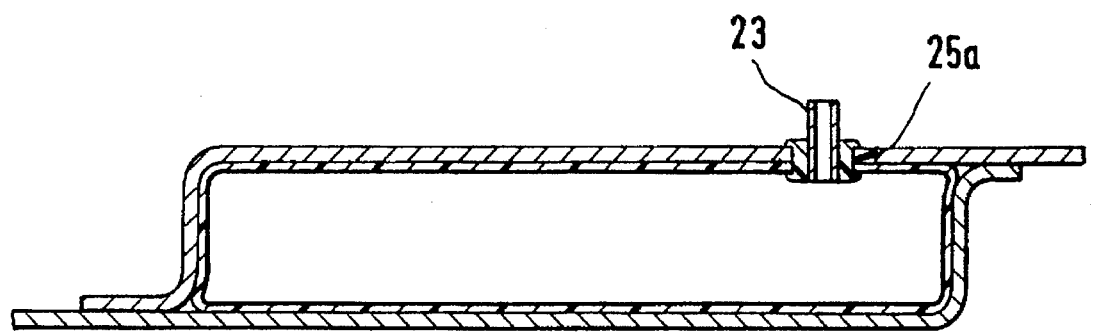

FIG. 2 shows how a cross section through a hollow body, e.g. an A-pillar which contains the door catches for the front doors, might appear. The cavity 19 of the hollow body can have a closed wall. A flexible envelope or bladder 21 preferably forms the compressed air container itself, whereby the reasons of safety and reliability, the envelope is realized as a multilayered structure. The wall of the hollow body preferably supports the envelope or bladder 21 on all sides, so that the strength requirements for the envelope are quite low. The envelope and thus the compressed air container are thereby capable of utilizing even cavities with complex shapes. For the connection to the air suspension system, there is preferably an air connection 23, which is simultaneously a component of the envelope 21. It is appropriate to simultaneously vulcanize the air connection to the envelope during the manufacture of the latter.

In accordance with at least one preferred embodiment of the present invention, the arrangements illustrated alternatively in FIG. 2 could conceivably be provided for any of a variety of uses. For example, it is conceivable that the arrangements illustrated in FIG. 2 could be configured to provide compressed air to another component of the automobile requiring compressed air, ostensibly, via connection 23 or other suitable connection.

Figure 3:
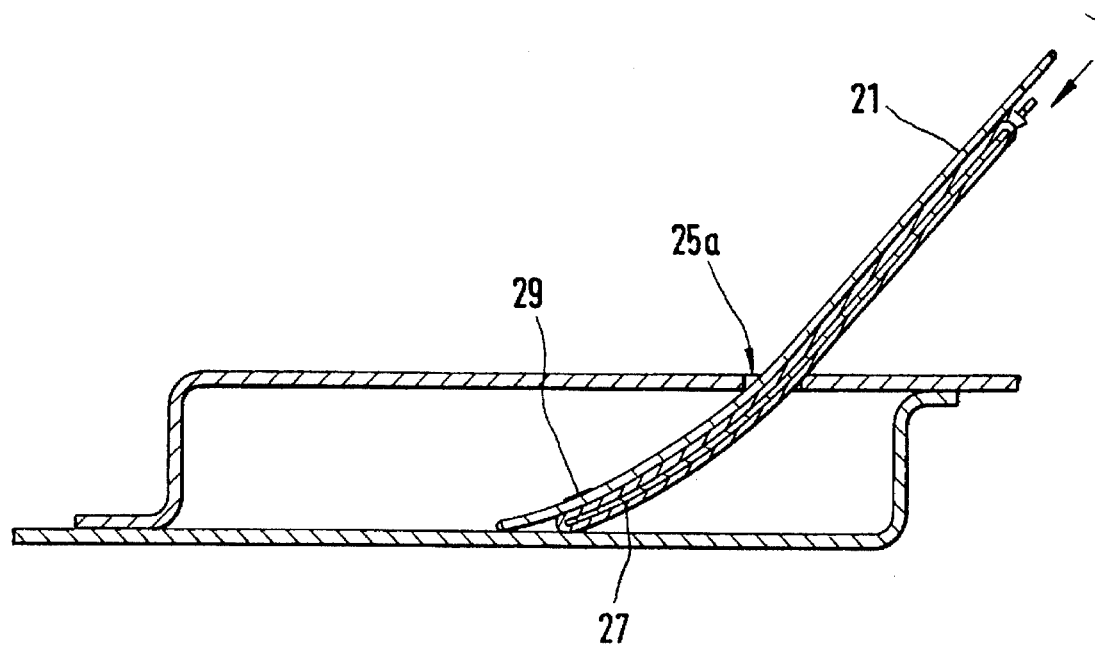
FIG. 3 illustrates the method for the installation of the envelope.
Figure 3:
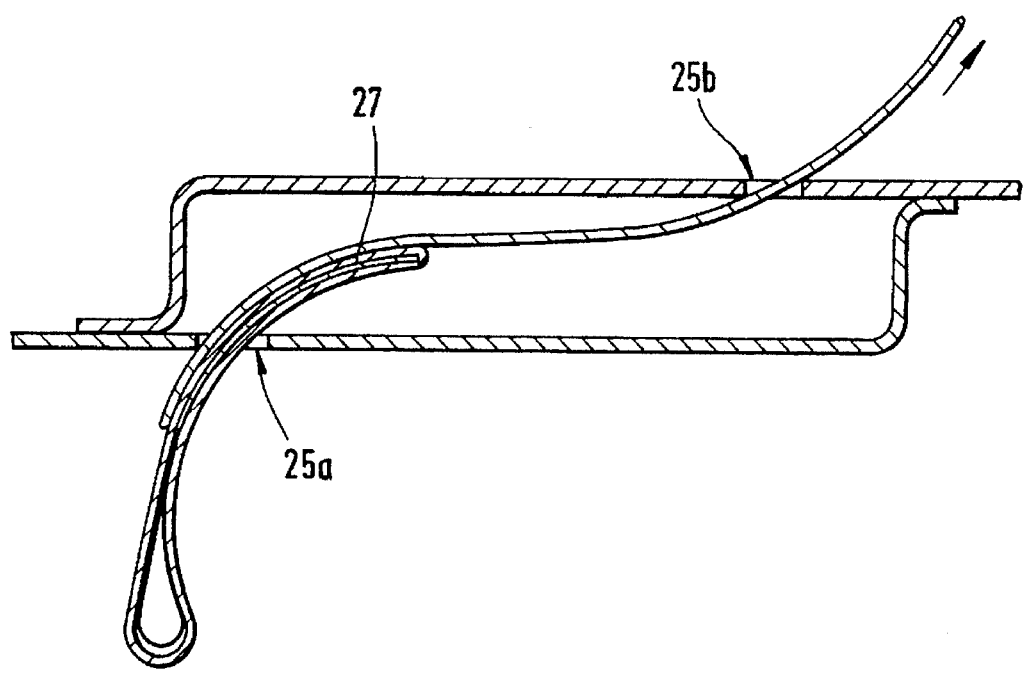

FIG. 3 illustrates how an envelope 21 for the compressed air container 13 can be installed in an arbitrary cavity 19 using extremely simple means. If the cavity 19 does not have an opening, an opening 25a is preferably made in the cavity. The envelope 21 is preferably introduced into the cavity 19 through the opening 25a. For this purpose, it is appropriate to use an installation rod 27 which is connected to the envelope, since the envelope 21 can be rapidly and smoothly inserted into the cavity using the installation rod 27. The fastening 29 between the installation rod and the envelope can be easily detached once the compressed air container has been installed.

In the lower illustration, two openings 25a,b can be used for the installation of the compressed air container, in which case the installation rod is inserted through the one opening 25a and removed through a second opening 25b. A second opening 25b is advantageous for filling the compressed air container, since the air in the cavity 19 could conceivably escape through this opening 25b (See FIG. 1, top).

Figure 4:
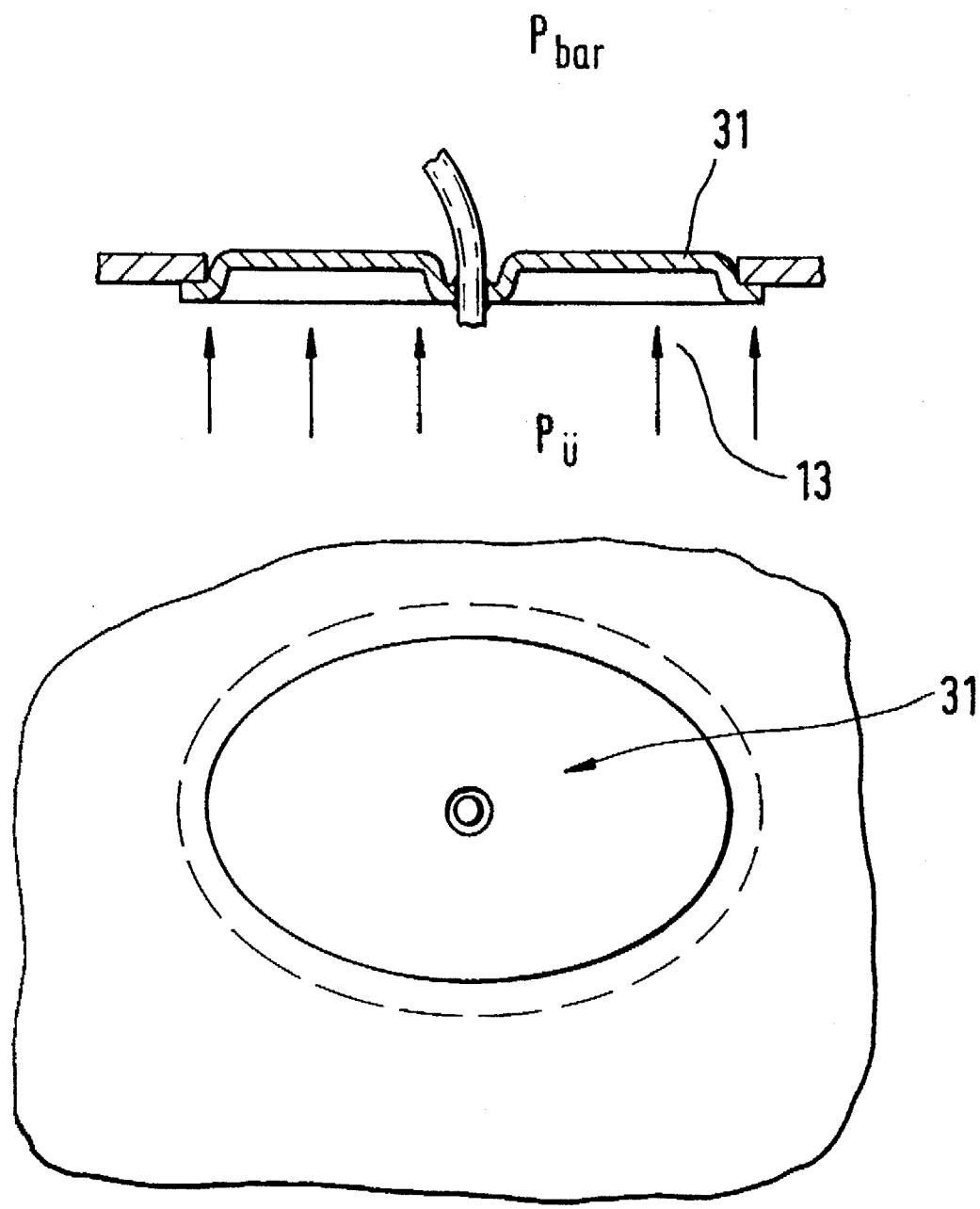
FIG. 4 shows the hollow body with cover.

In the embodiment illustrated in FIG. 4, quite large openings can be closed by a cover 31, after the envelope 21 has been inserted into a cavity 19 (not shown). The introduction of the envelope is particularly simple, and the fastening of the cover 31 does not require any assembly or installation tools or clamps, since the cover 31 is held closed by the pressure of the compressed air inside the container, and the cover 31 is braced against the inside wall of the cavity 19.

Accordingly, in accordance with at least one preferred embodiment of the present invention, cover 31 may be considered to be relatively large cover, removeable from a greater cavity structure. Such a greater cavity structure could conceivably be embodied, for example, by the cavity 19 illustrated in either of FIG. 2 or 3, or by another type of cavity in the automobile, as discussed throughout this specification. Essentially, it will be appreciated that such a cover 31 can provide access to a greater area or space of a cavity structure than would otherwise be possible without such a cover. This eased accessibility can then facilitate insertion of an envelope 21 into a cavity structure. Preferably, the cover 31 can be structured in a manner similar to that shown in the upper portion of FIG. 4, to ensure that any compressed air inside the cavity structure (indicated as $P_ü$) will hold the cover 31 against the inner walls of the cavity structure. It will be understood that the designation "$P_{bar}$" shown in FIG. 4 may be considered to represent atmospheric pressure.

Figure 5A:
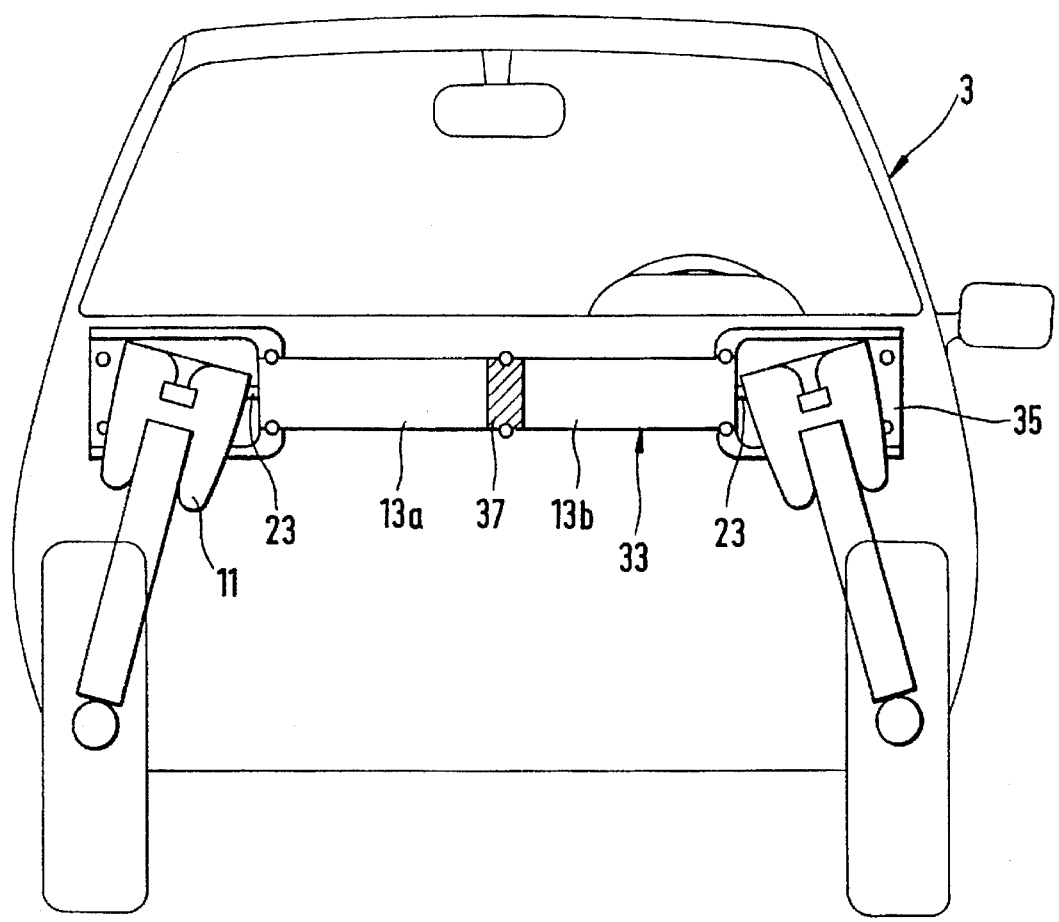
FIGS. 5a and 5b show the compressed air container inside a frame crossmember.
Figure 5B:
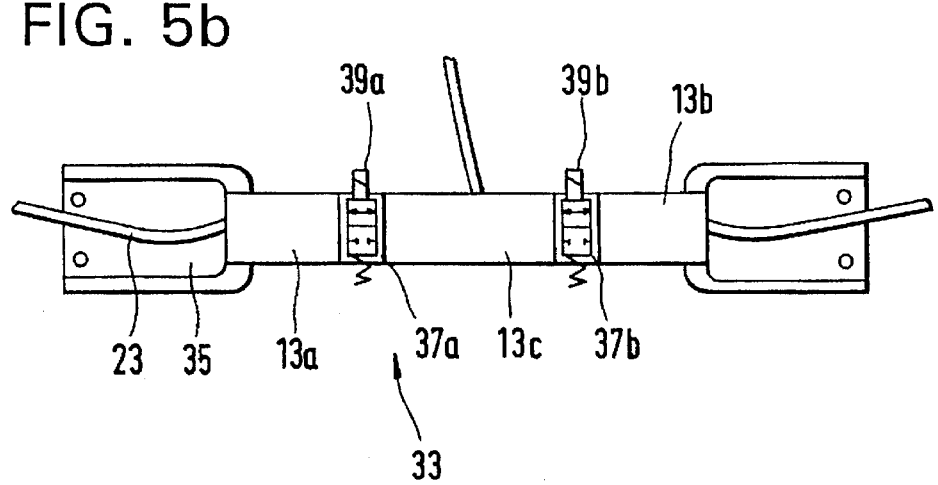

FIGS. 5a and 5b illustrate an alternative embodiment of a compressed air container 13 inside a cavity 19. An arbitrary frame crossmember 33, e.g. a crossmember underneath one of the bench seats in the passenger compartment, is preferably tubular and has a connection 23 to an air spring 11, or to several such air springs. Flanges 35 on the end make it possible to connect the frame crossmember to the vehicle body 3. In the illustrated embodiment, the crossmember 33 is preferably divided in two by a disc body 37 which acts as a partition. Each segment 13a; 13b of a compressed air compartment corresponds to one or more air springs 11. The manufacture of such a crossmember does not present any problems.

The crossmember 33 illustrated in FIG. 5b is preferably divided into three parts by two disc bodies 37a, 37b, namely into one main reservoir 13c and two supplemental reservoirs 13a/13b. Inside the partitions 37, switchable valves 39a/b are preferably installed, e.g. 2/2 solenoid valves, which can be used to connect the supplemental reservoirs 13a/b as required to the main reservoir 13c, or to connect the air springs 11 by means of the respective supplemental reservoir 13a/b to the main reservoir 13c.

Thus, in accordance with at least one preferred embodiment of the present invention, in using a cross-member 33, compressed air can conceivably be introduced into a main reservoir 13c, and then selectively distributed to supplemental reservoirs 13a and 13b. The selective distribution of compressed air between main reservoir 13c and supplements reservoirs 13a and 13b may be facilitated by solenoid valve 39a and 39b, the former of which can preferably be interposed between main reservoir 13c and supplemental reservoir 13a, and the latter of which may preferably be interposed between main reservoir 13c and supplemental reservoir 13b. Such solenoid valves will generally be well-known to those of ordinary skill in the art, and thus do not appear to warrant further description herein. However, it is conceivable that each such solenoid valve 39a, 39b, may be configured so as to be positionable between a closed position and an open position, wherein, in the open position, compressed air can be freely admitted between main reservoir 13c and the supplemental reservoir 13b in question, and in the closed position, the flow of compressed air will be inhibited or blocked between main reservoir 13c and the supplemental reservoir 13a or 13b in question.

Figure 6:
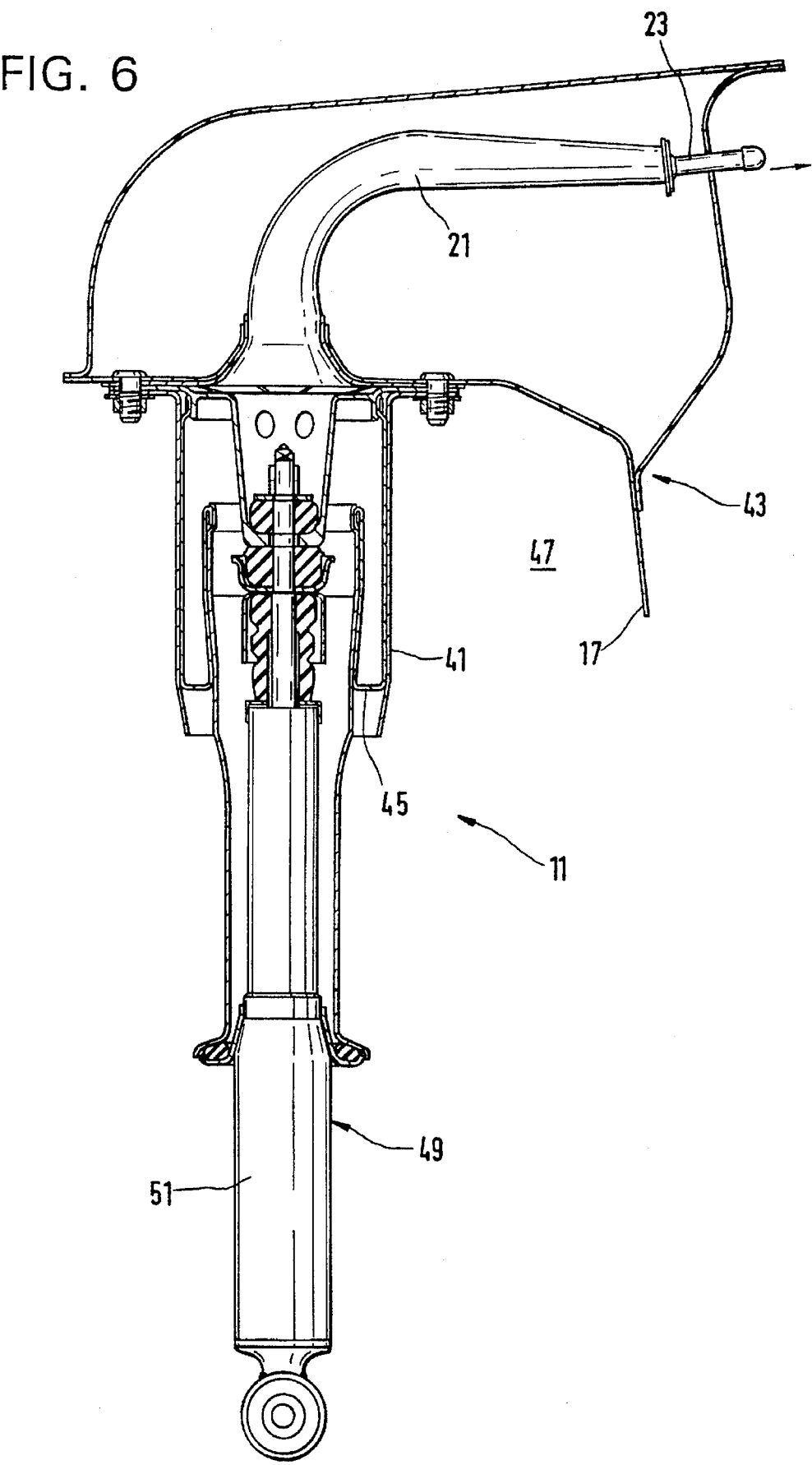
FIG. 6 shows the compressed air container in an air spring in the dome of a wheel wall.

In FIG. 6, the compressed air container is a component of the air spring 11. On the air spring, an external tube 41 is preferably bolted to a wheel well dome 43, the auto body sheet metal 17 of which contains the flexible envelope 21. The structure of the envelope 21 is preferably the same as in the illustration in FIG. 2. The entire air volume consists preferably of the portion which lies inside the wheel well dome, and the part formed by a sleeve 45 of the air spring 11. To supply the air spring, there is also preferably an air connection 23, the mouth of which is outside the area of the wheel well 47 and is thus particularly effectively protected. No structural modifications need to be made to the air spring 11 itself. In this embodiment, the air spring is part of a shock absorber 49, the cylinder tube 51 of which supports an internal axle tube or pylon 53, and is also the body which defines the air volume.

Figure 7:
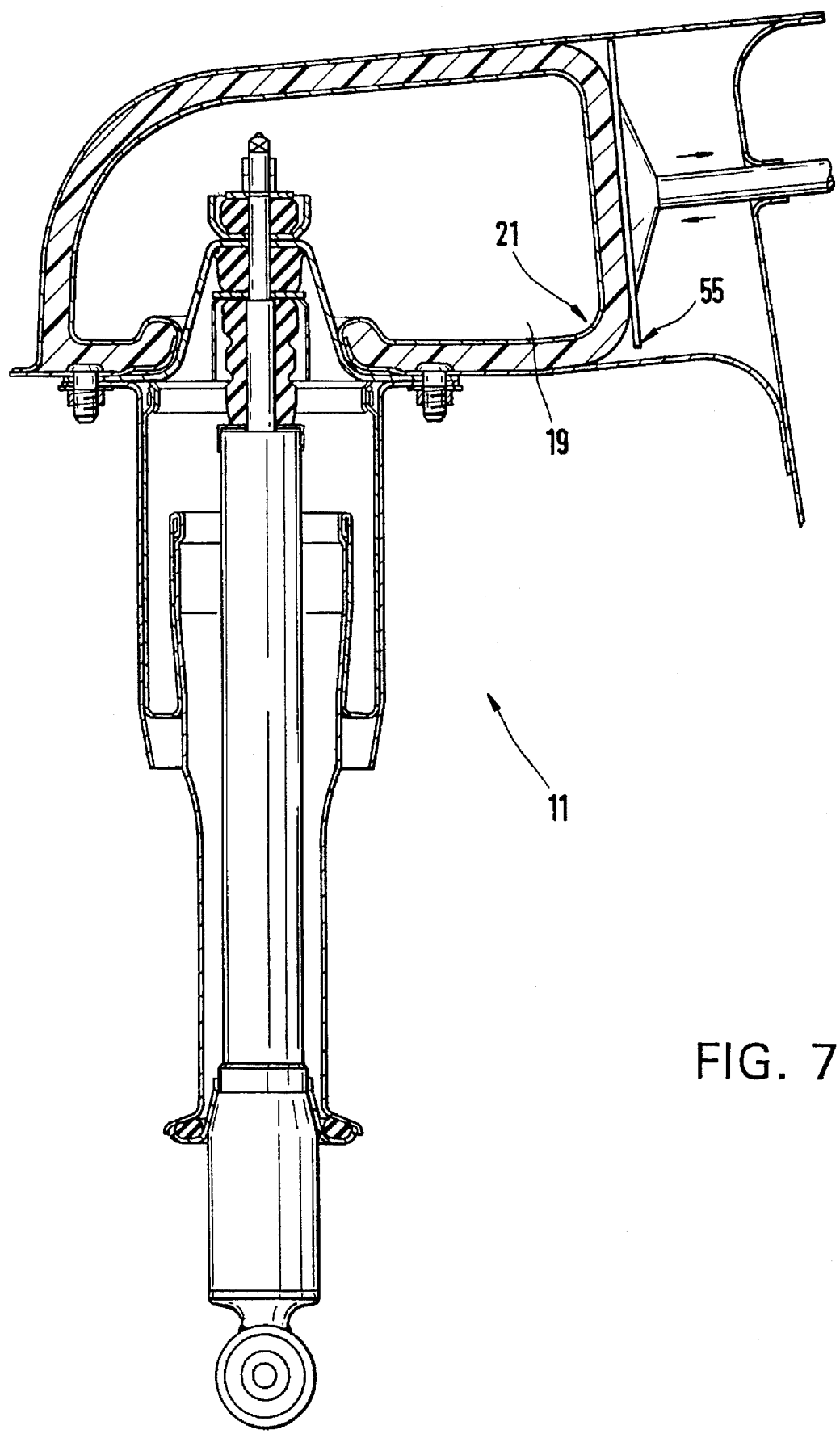
FIG. 7 shows a compressed air container with an adjustable suspension rate.

The compressed air container or the air spring 11 illustrated in FIG. 7 is largely the same as the embodiment illustrated in FIG. 6. It should be noted that the flexible envelope 21 can also be smaller than the cavity 19. In that case, the flexible envelope could preferably be able to withstand the operating pressure without being supported by a wall. The dimensions of the envelope are then independent of the size of the cavity. But FIG. 7 also shows that the suspension rate or spring rate of the air spring 11 can be influenced by a part of the wall 55 which is designed as an axially movable plate, i.e. the output pressure inside the flexible envelope can be increased by reducing the volume of the cavity. The flexible envelope and thus the air spring can be filled by means of a one-time air filling connection tube, not shown. Then the one-time air filling connection tube can be welded shut, so that no pressure losses can occur, and no pump units etc. are necessary for further operation.

Accordingly, in accordance with at least one preferred embodiment of the present invention, flexible envelopes 21 of the general type described heretofore, may be used in conjunction with air springs 11, as illustrated alternatively in FIGS. 6 and 7. With respect to the embodiment of FIG. 6, it should be understood that the air spring 11 can conceivably be of a considerably smaller volume than the cavity in which it resides. In other words, envelope 21, as shown in FIG. 6, may be of such a considerably smaller volume than the surrounding cavity, such that it is neither contacted nor supported by any cavity walls. In this case, the envelope 21 will preferably be able to withstand operating pressures without being supported by a wall.

On the other hand, as shown in FIG. 7, a moveable wall 55 can be provided that can contact an outer portion of envelope 21, so as to selectively compress envelope 21. In other words, the effective volume of what may be considered to be cavity 19 can be selectively reduced by axially moving moveable wall 55, thereby impinging upon envelope 21 so as to further compress the compressed air disposed within envelope 21. Conceivably, any suitable mechanism may be utilized for applying the aforementioned axial force to moveable wall 55, in such a manner that the moveable wall 55 will selectively move in either direction as indicated by the arrows in FIG. 7.

The use of the invention is nor limited to passenger vehicles. It can also be used on utility vehicles.

The disclosure now turns to a discussion of a pneumatic spring that may be utilized in accordance with the embodiments of the present invention. It is to be understood that components discussed herebelow with reference to FIG. 8–11f may, if appropriate, be considered to be interchangeable with similar components discussed hereabove with reference to FIGS. 1–7.

Figure 8:
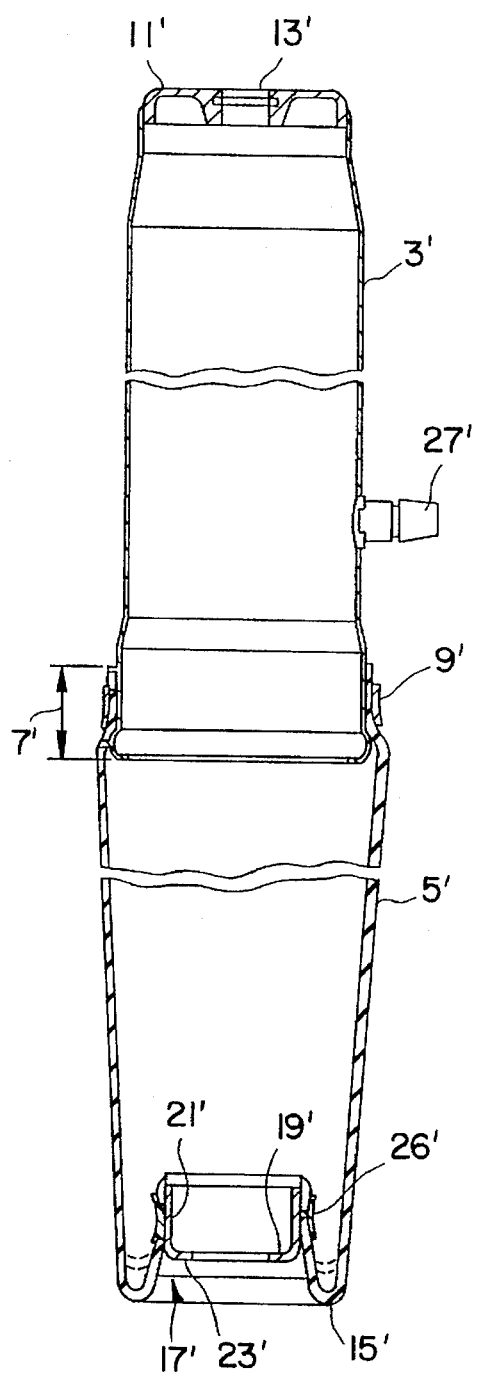
FIG. 8 shows a pneumatic spring in detail.

The pneumatic spring 1' illustrated in FIG. 8 preferably includes a receptacle 3' and an elastic expansion bellows 5'. The receptacle 3' and the expansion bellows 5' are preferably inserted into one another over a short shoulder 7', and are preferably connected in an airtight manner by means of a tape tensioning element 9'. On an end of the receptacle 3' opposite the shoulder 7', a cover piece 11' is preferably attached in an airtight manner, and the cover piece 11' preferably has a hole 13' in the center. The free end of the expansion bellows 5' is preferably turned up over a short length, so that there is preferably a fold 15'. On the end of the expansion bellows 5' preferably has a locking piece 17' designed as a cup 19'. The cup 19' preferably includes a sleeve part 21' and a bottom 23' which has an opening 25'. The sleeve part 21' is also preferably connected by means of a tape tensioning element 26' to the expansion bellows. The diameters of the hole 13' and the opening 25' are preferably such that a piston rod of a shock absorber can run through them.

To supply compressed air to the pneumatic spring, there is preferably a connection pipe 27' on the receptacle 3'.

The pneumatic spring 1' or pneumatic spring shell can be fabricated completely independently of a shock absorber, up to the stage illustrated in FIG. 8.

Figure 9:
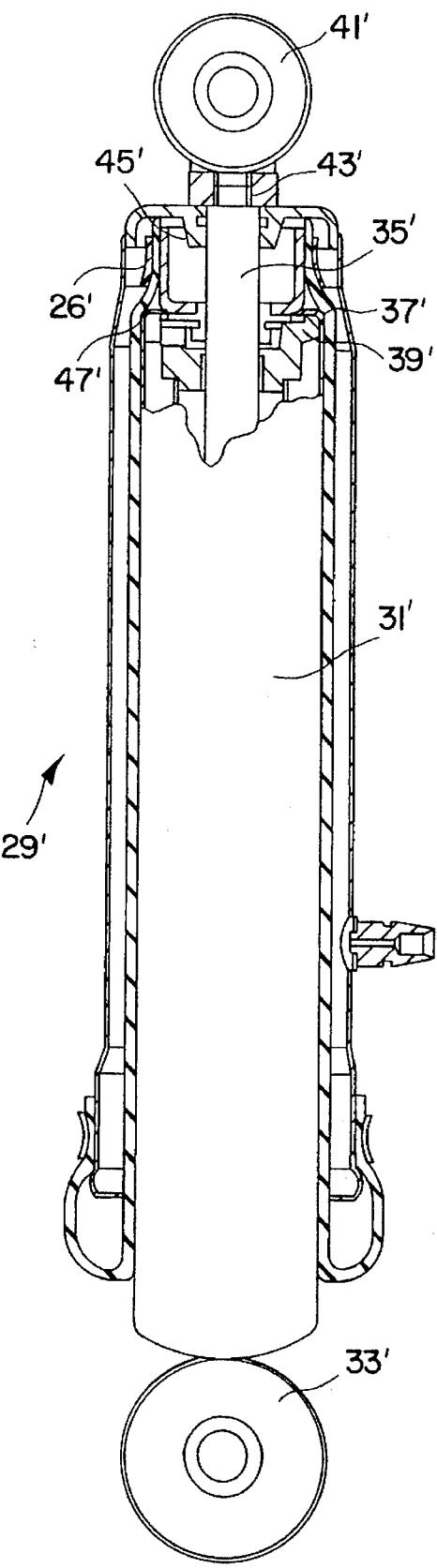
FIG. 9 shows a pneumatic spring following assembly with a shock absorber.

FIG. 9 shows a fully-assembled shock absorber 29'. The illustration of the shock absorber 29' is limited to an outside view which shows a shock absorber outer tube 31', the end of which is equipped with a connecting mechanism 33' for attachment to a wheel mounting. It should be understood that shock absorber 29', when assembled with pneumatic spring 1', essentially represents a "shock absorber assembly" in accordance with the present invention.

During the assembly of the shock absorber 29' with the pneumatic spring 1', the shock absorber 29' with a partly extended piston rod 35' is preferably introduced through the opening 25' of the locking piece 17' into the pneumatic spring 1', until the bottom 23' on the cup 19' comes into contact against a flange 37' of the shock absorber outer tube 31' on a piston rod guide 39'. Then the cover 11' is preferably threaded by means of its central hole 13' onto the piston rod 35'. During this process, the expansion bellows preferably lies against the outer tube of the shock absorber, which thus represents an unrolling surface for the expansion bellows. The cover 11' is preferably sealed in relation to the piston rod 35'. In the final assembly stage, a connection mechanism 41' is preferably screwed by means of a thread 43' to the piston rod 35'. The connection mechanism 41' preferably comprises an axial support surface 45', so that the pneumatic spring is preferably axially fixed by means of the end surface 47' which is formed by the flange 37', and by means of the mounting surface 45', taking advantage of the system pressure prevailing inside the pneumatic spring 1'.

The mounting surface 45' need not necessarily be a direct component of the connection mechanism 41', but it can also be at some axial distance. The seal of the pneumatic spring against the atmosphere in the vicinity of the expansion bellows 5' is preferably produced by contact between the expansion bellows 5' and the unrolling surface on the shock absorber, whereby, once again, the system pressure acting on the contact surface can preferably be used to guarantee that the expansion bellows 5' is practically self-sealing. It is advantageous if the expansion bellows 5' exerts a slight pressure fit against the outer tube 31' of the shock absorber.

FIGS. 10a to 10g illustrate several variants of a cover piece 11', the selection of which is preferably determined primarily by the number of pneumatic springs to be produced. For very large production runs, a highly appropriate version resembles the one illustrated in FIG. 10a, in which the receptacle 3', in the vicinity of its end, has been shaped to form the cover, so that the receptacle and the cover piece form a single part. A bead 48' forms a chambered seal 49' against the piston rod 35'. To increase strength, there can preferably be a supporting ring 51' disposed between the cover piece 11' and the mounting surface 45' of the connecting mechanism 41'.

Figure 10A:
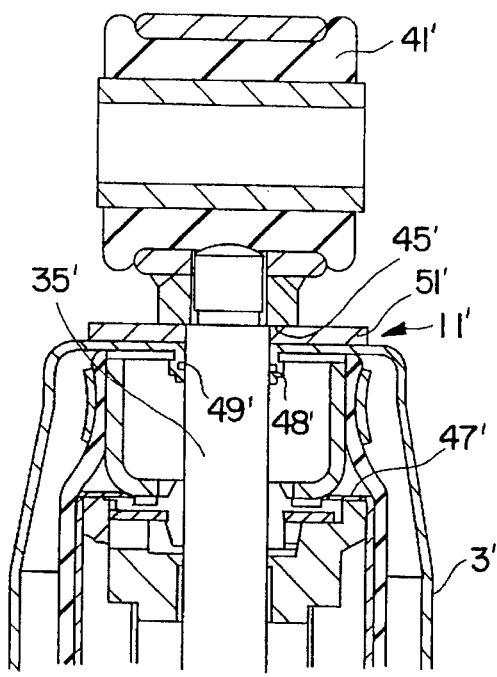
FIGS. 10a, 10b, 10c, 10d, 10e, 10f and 10g show variants of various covers.
Figure 10B:
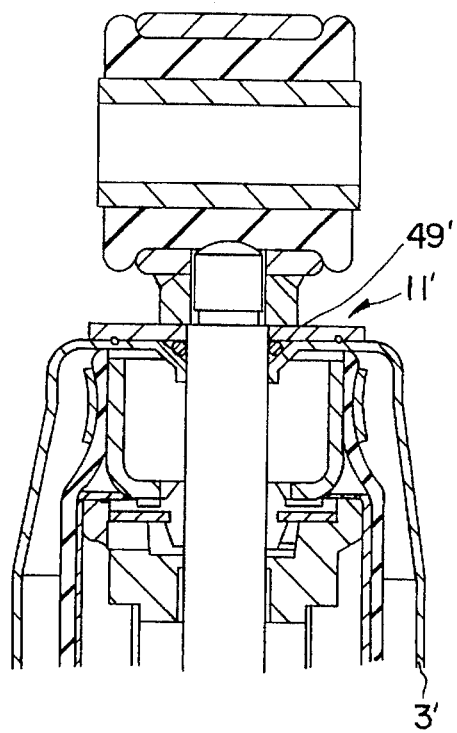
Figure 10C:
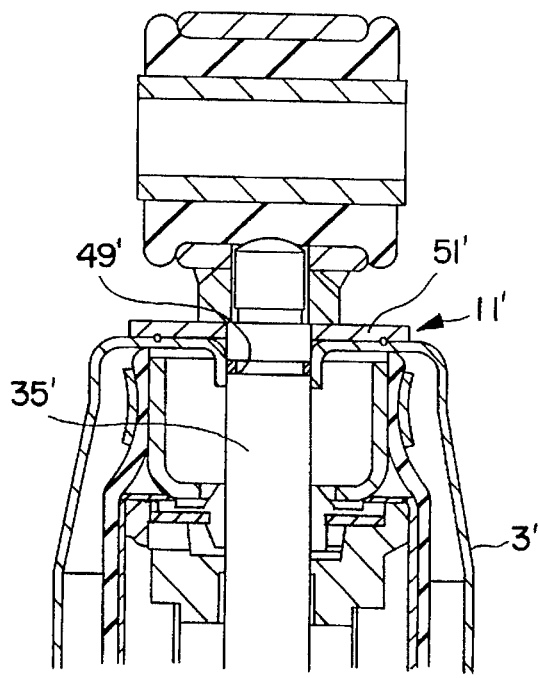
Figure 10D:
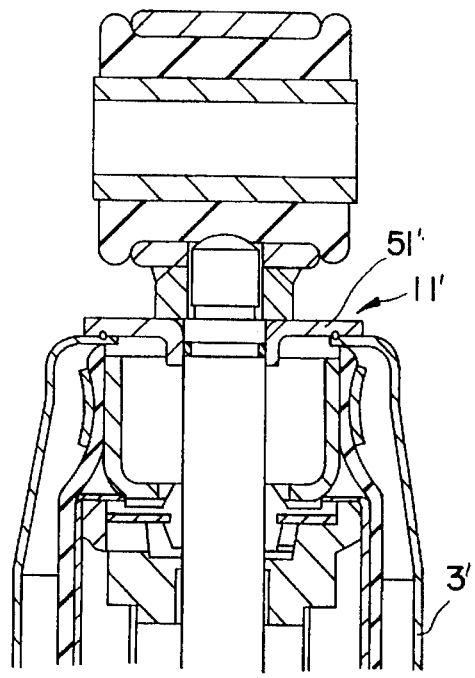

FIG. 10b is essentially the same as FIG. 10a. The chambered seal 49' in this case is between the supporting ring 51' and the cover piece 11'. Alternatively, as shown in FIG. 10c, the version illustrated in FIG. 10b can be modified so that the seal 49' can also be inside a groove in the piston rod 35'. The supporting ring 51' can also be used to form a chambered seal 49', and at the same time, together with the end of the receptacle 3', it forms the cover piece 11'. FIG. 10d illustrates such an arrangement.

Figure 10E:
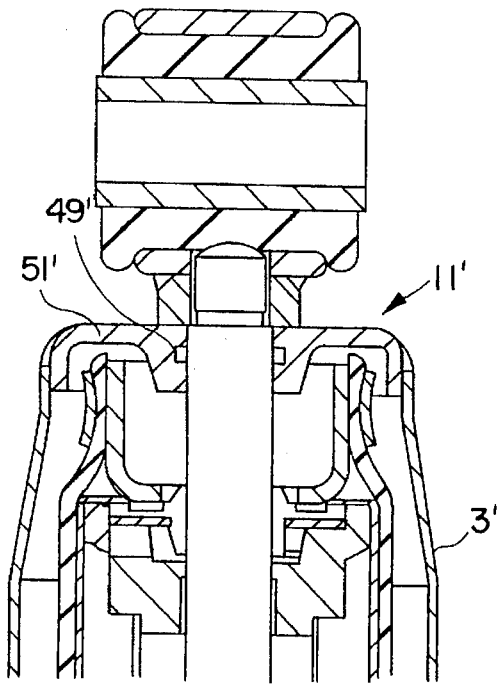
Figure 10F:
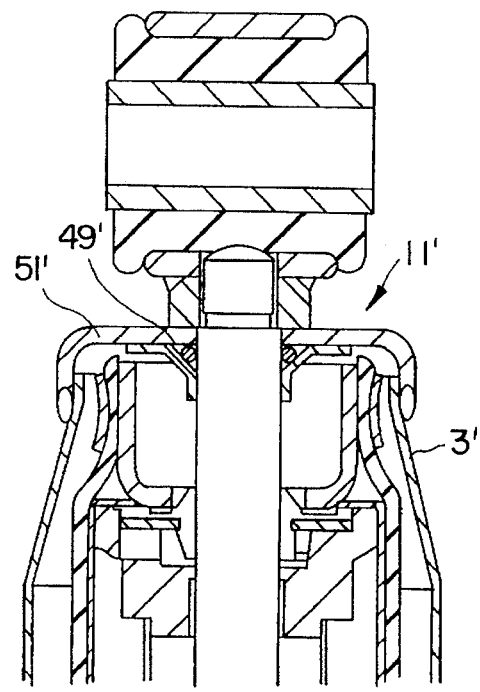
Figure 10G:
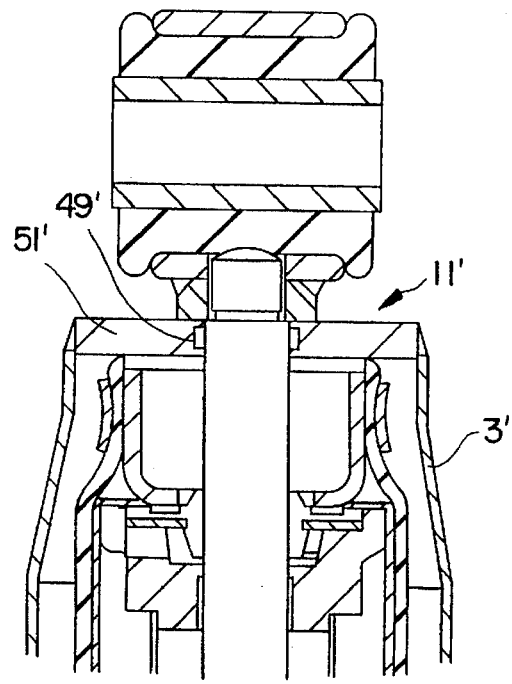

The versions illustrated in FIGS. 10e–g are particularly well-suited for extremely small production runs of pneumatic springs. In these variants, the cover pieces 11' are formed by a separate disk body 51' which is welded to the receptacle 3'. The reshaping work required for the disk body is progressively reduced until FIG. 10g, in which a flat disc is used.

In other words, in accordance with a preferred embodiment of the present invention, as illustrated in FIGS. 10e–g, a separate disk body 51', welded to receptacle 3', may preferably be used for cover piece 11'. FIGS. 10e–g essentially illustrate varying degrees of shaping for the disk body constituting cover piece 11' wherein a greater degree of shaping would essentially be required for the cover piece shown in FIG. 10e, a lesser degree of shaping would essentially be required for the cover piece shown in FIG. 10f, and a still lesser degree of shaping would essentially be required for the cover piece shown in FIG. 10g.

Figure 10H:
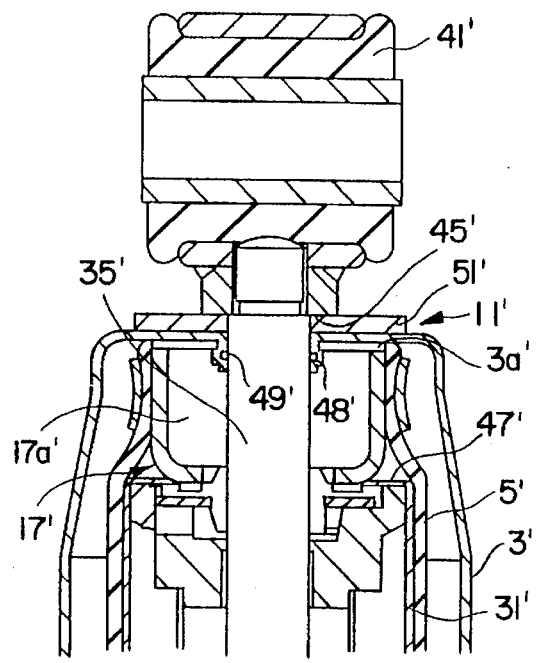
FIGS. 10h, 10i, 10j, 10k, 10l, 10m and 10n are essentially the same views as FIGS. 10a–10g, but more detailed.
Figure 10I:
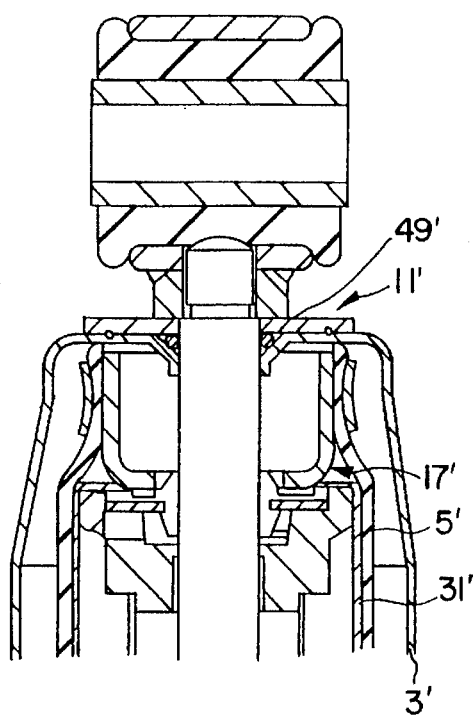
Figure 10J:
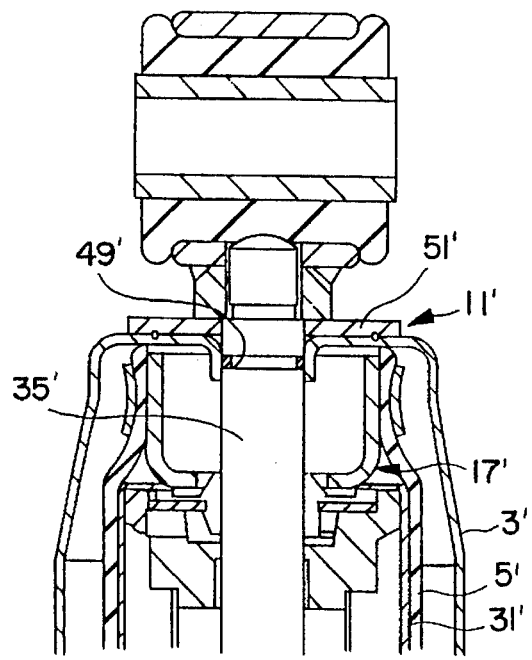
Figure 10K:
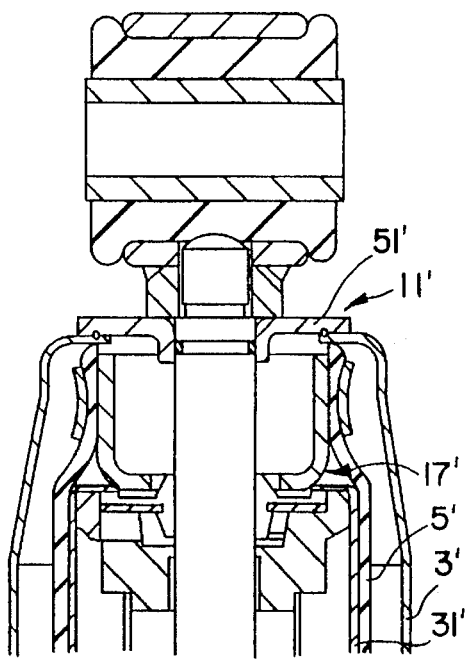
Figure 10L:
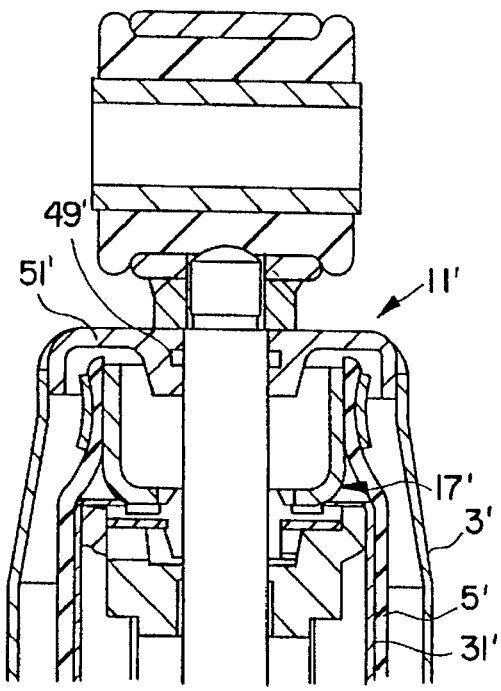
Figure 10M:
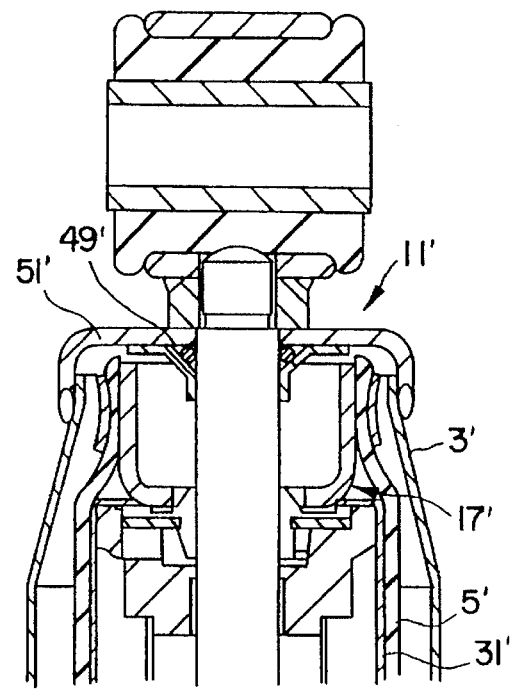
Figure 10N:
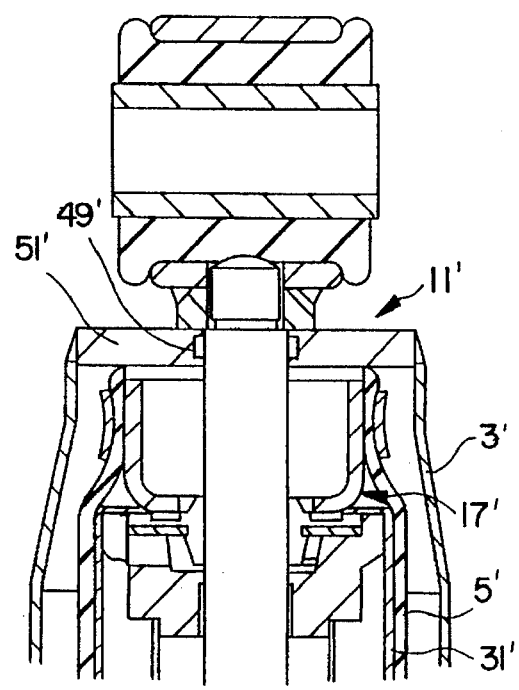

FIGS. 10h–10n are, respectively, essentially the same views as FIGS. 10a–10g, but more detailed. FIG. 10h particularly illustrates that, in accordance with the present invention, it is conceivable to permit an essentially loose seal to permit air into the cavity 17a' formed by locking piece 17'. Thus, a small gap 3a' may essentially be provided in the vicinity of an upper rim portion of locking piece 17'.

In addition to the locking piece 17' described above and illustrated in FIGS. 8 and 9, FIG. 11a illustrates a locking piece 17' which has the same basic layout. One additional distinction is that, on a tape tensioning element between the sleeve body 21' and the expansion bellows 5', there can be a beaded rim 53', which preferably braces the end of the expansion bellows 55' against the sleeve part 21'. The connection between the locking piece 17' and the expansion bellows does not essentially need to be recloseable, so that this type of connection can be used.

Figure 11A:
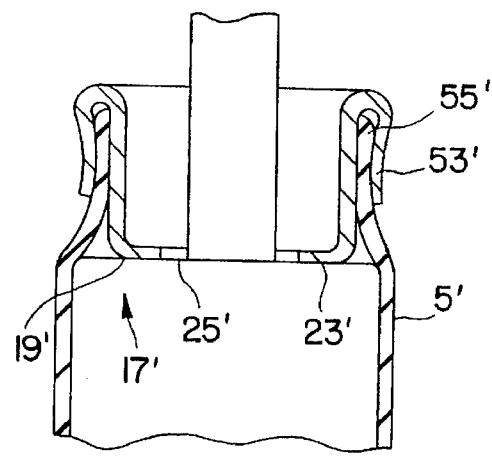
FIGS. 11a, 11b and 11c show variants of various locking pieces.
Figure 11B:
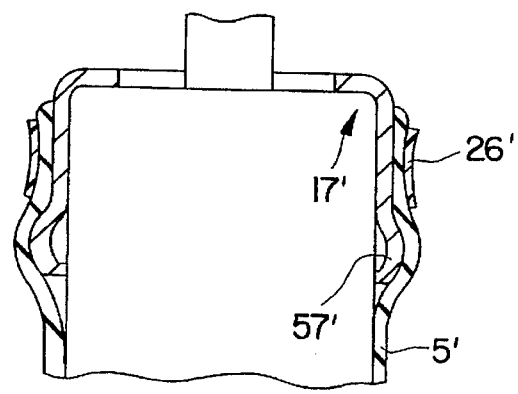

The basic layout of the locking piece 17' illustrated in FIG. 11b is largely the same as in FIGS. 8 and 9. One additional distinction is that the cup 19' can be oriented with the axial extension of the sleeve part 21' disposed in the direction of the connection mechanism 33' (see FIG. 9), so that the inside bottom 23' comes into contact with the end surface 47' of the outer tube 31' of the shock absorber 29'. The outside bottom can be used, for example, as the impact surface for an additional spring (not shown). The expansion bellows 5' is preferably doubly secured in relation to the cup 19' by way of a bead 57'. Compared to a cup without such a bead 57', the maximum stability under load of the locking piece is increased, because the expansion bellows is secured axially by the bead 57' and also by the tape tensioning element 26'.

Figure 11C:
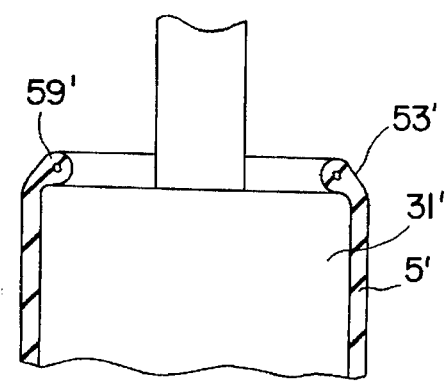

A particularly simple locking piece 17' can be obtained, as shown in FIG. 11c, if it is made an integral part of the expansion bellows 5'. The opening of the expansion bellows end 53 is preferably smaller than the diameter of the shock absorber, so that the expansion bellows end 53 can be braced against the end surface 47 of the outer tube 31' of the shock absorber. To increase the strength of the unit, a reinforcement 59' can preferably be inserted inside the end 53' of the expansion bellows.

Figure 11D:
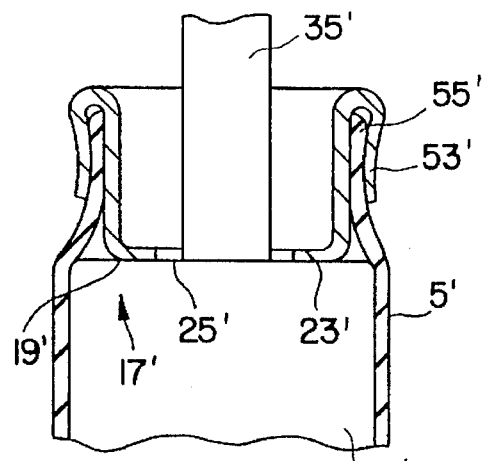
FIGS. 11d, 11e and 11f are essentially the same views as FIGS. 11a–11c, but more detailed.
Figure 11E:
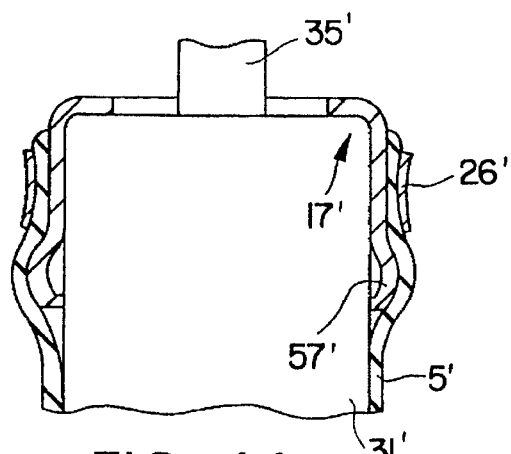
Figure 11F:
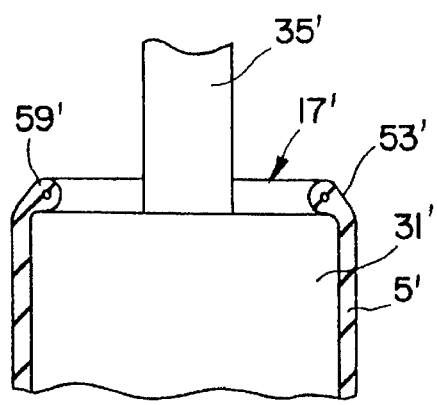

FIGS. 11d–11f are substantially the same views as FIGS. 11a–11c, but more detailed.

Figure 12:
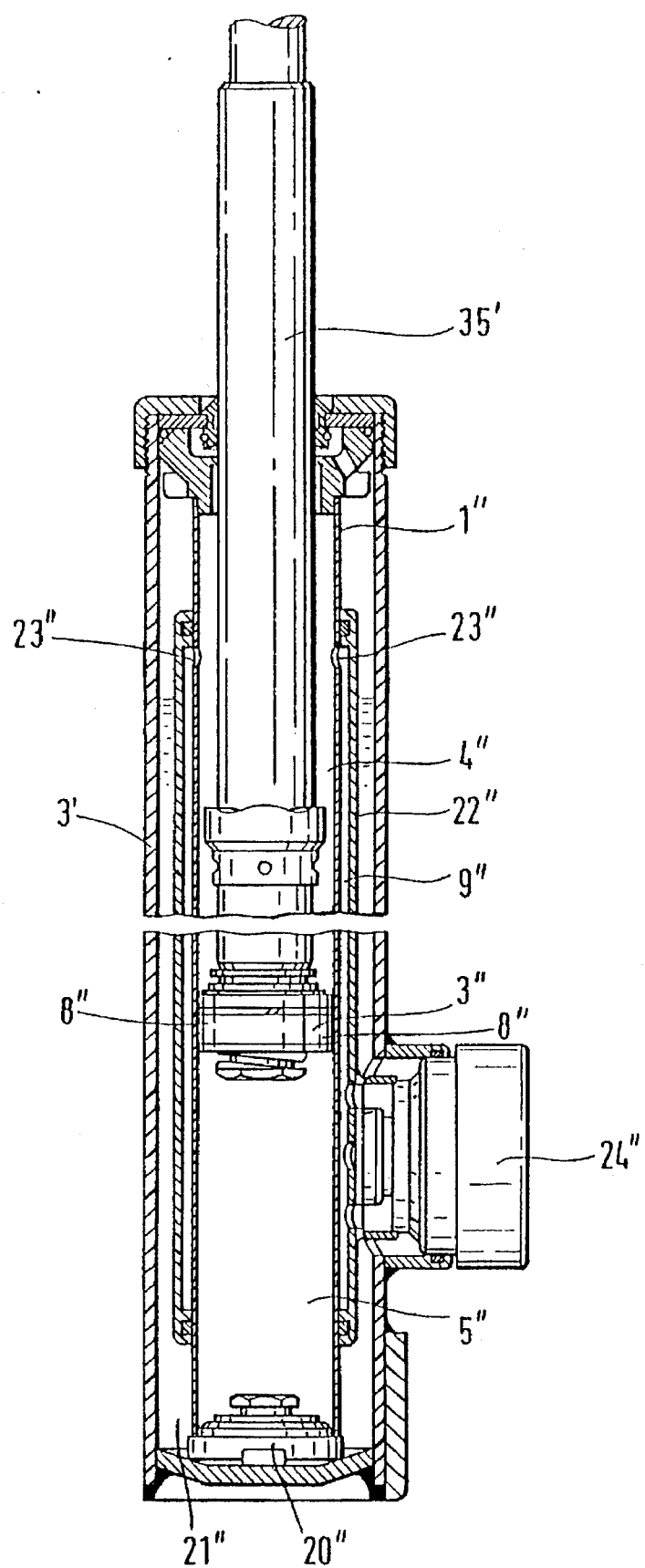
FIG. 12 illustrates a shock absorber which may be employed in accordance with the embodiments of the present invention.

FIG. 12 shows an example of a shock absorber which may be employed in accordance with the embodiments of the present invention. As illustrated in FIG. 12, an adjustable two-tube shock absorber can generally include a cylinder 1", which sealingly contains a hydraulic fluid, a piston rod 35', which piston rod 35' can sealingly project into cylinder 1" and which piston rod 35' can be axially displaceable with respect thereto, and a damping piston 3", which damping piston 3" can be sealingly disposed within cylinder 1" and can be connected to piston rod 35'. Piston rod 35' can be attached to a structure portion, e.g., of a vehicle, which is not shown. Piston 3" can divide cylinder 1" into upper and lower working chambers 4" and 5", respectively, and can be provided with axially throughgoing passages and associated bottle valves 8" of conventional design and well known in the art, which can provide a substantially constant and non-variable resistance to the axial displacement of piston 3" and piston rod 35'.

Two additional cylinders of progressively greater diameter 22", and 3' can be disposed coaxially with cylinder 1", so as to surround cylinder 1", thereby providing two additional annular chambers, a bypass chamber 9" and an equalization chamber 21". Bypass chamber 9" can preferably interconnect with the working chambers via orifices 23", and a valve 20", located at the bottom of cylinder 1". The bypass chamber 9" can preferably provide a means by which the damping medium contained therein can reach equalization chamber 21". Cylinder 3' may essentially correspond to the outer tube 3' discussed heretofore.

A damping force control unit 24", which can act hydraulically in parallel with throttle valves 8" to modify the substantially constant damping force which throttle valves 8" can provide, can be mounted as a separate component attached to the shock absorber, and can be in fluid communication with bypass 9" and equalization chamber 21".

It will be appreciated from the disclosure hereinabove that a pneumatic spring, or shock absorber assembly, or a method of making a shock absorber assembly, according to the present invention provides several advantages in comparison with known pneumatic springs, shock absorber assemblies, and methods of making shock absorber assemblies. Among these advantages is the fact that a pneumatic spring according to the present invention can essentially represent a standardized component which is appropriate for use with any of a large number of different shock absorbers, such shock absorbers having varying configurations on the outer tubes thereof. Thus, in a method of assembling a shock absorber assembly in accordance with the present invention, the manufacturing process may essentially be simplified in that there will essentially be less of a need for customized hardware. Particularly, the present invention allows for the mounting of a pneumatic spring according to the present invention with any of a wide range of different shock absorbers, while known processes would essentially require customized assembly processes or customized hardware for different types of shock absorbers.

One feature of the invention resides broadly in the compressed air container of an air suspension system for a vehicle with a vehicle frame and a vehicle superstructure, comprising a number of elastic air springs which are connected to the reservoir, whereby the air springs and the reservoir are to be considered compressed air containers, characterized by the fact that at least one compressed air container 13 is located inside at least one cavity 19 formed by at least one vehicle part which is independent of the air suspension system 7 strictly speaking.

Another feature of the invention resides broadly in the compressed air container characterized by the fact that the independent vehicle part is a cavity of a vehicle body 17.

Yet another feature of the invention resides broadly in the compressed air container characterized by the fact that a wheel well dome 43 into which the air spring at least projects is used as the vehicle part.

Still another feature of the invention resides broadly in the compressed air container characterized by the fact that the compressed air container 13 is formed by a flexible envelope or sleeve or capsule 21 which, when filled, is in contact with the wall(s) of the cavity 19.

A further feature of the invention resides broadly in the compressed air container characterized by the fact that the volume of the flexible envelope 21 is less than that of the cavity 19.

Another feature of the invention resides broadly in the compressed air container characterized by the fact that the flexible envelope has an air connection 23 which is in contact with the wall of the cavity.

Yet another feature of the invention resides broadly in the compressed air container characterized by the fact that the flexible envelope 21 is multilayered.

Still another feature of the invention resides broadly in the compressed air container characterized by the fact that at least one part 55 of the wall which forms the cavity is realized so that its position can be changed in relation to the rest of the wall.

A further feature of the invention resides broadly in the compressed air container characterized by the fact that the part is formed by an axially movable plate.

Another feature of the invention resides broadly in the compressed air container characterized by the fact that the axially movable plate has a drive mechanism to change the volume of the cavity.

Yet another feature of the invention resides broadly in the compressed air container characterized by the fact that the envelope 21 has a one-time or non-reusable or expendable air filling connection.

Still another feature of the invention resides broadly in the compressed air container characterized by the fact that the body part is realized as a crossmember 33.

A further feature of the invention resides broadly in the compressed air container characterized by the fact that the crossmember 33 has a partition 37 which divides the compressed air container 13 in a sealed manner into two individual reservoirs 13a;b.

Another feature of the invention resides broadly in the compressed air container characterized by the fact that the frame crossmember has two partitions 37a;b which divide the reservoir 13 in a sealed manner, so that one main reservoir 13c and two supplemental reservoirs 13a;b are formed.

Yet another feature of the invention resides broadly in the compressed air container characterized by the fact that the partitions 37a;b have switchable connecting valves 39a;b between the supplemental reservoirs 13a;b and the main reservoir 13c.

Still another feature of the invention resides broadly in the method for the assembly of a compressed air container characterized by the fact that the envelope 21 of the reservoir 13 is introduced into the cavity 19 through an opening 25a, the envelope 21 is filled with a gas medium, and the opening 25a is closed, except for a connecting passage to the air springs 11.

A further feature of the invention resides broadly in the method characterized by the fact that the envelope 21 is folded flat and connected to a flexible assembly rod 27, and the envelope is introduced into the opening 25a by means of the assembly rod.

Another feature of the invention resides broadly in the method characterized by the fact that the opening 25a is closed by a cover 31 which is located inside the cavity 19, the closing force on which is the pressure inside the compressed air container.

Examples of a-pillars which may be utilized in accordance with the embodiments of the present invention, may be found in the following U.S. patents: U.S. Pat. No. 5,231,253, entitled "Side Impact Sensors," and U.S. Pat. No. 5,374,099, entitled "Motor Vehicle Having an Open Roof Construction."

Examples of bladders which may be utilized in accordance with the embodiments of the present invention, may be found in the following U.S. patents: U.S. Pat. No. 5,215,124, entitled "Accumulator," which issued on Jun. 1, 1993; U.S. Pat. No. 5,176,178, entitled "Accumulator with Randomly Uniplanar Bladdar Collapse," which issued on Jan. 5, 1993; and U.S. Pat. No. 5,246,761 entitled "Bladder for an Accumulator," which issued on Sep. 21, 1993.

Examples of pneumatic springs, alternatively termed as "air springs" or "air shocks", and components thereof, which may be utilized in accordance with the embodiments of the present invention, may be found in the following U.S. patents: U.S. Pat. No. 5,180,144, which issued to Hellyer et al. on Jan. 19, 1993; No. 5,009,401, which issued to Weitzenhof on Apr. 23, 1991; No. 4,988,082, which issued to Pees on Jan. 29, 1991; No. 4,332,397, which issued to Steger on Jun. 1, 1982; and No. 4,166,522, which issued to Bourcier on Sep. 4, 1979.

Examples of shock absorbers, which may be utilized in accordance with the embodiments of the present invention may be found in the following U.S. patents: U.S. Pat. No. 4,838,393, entitled "Hydro-mechanical Stop having a Restrictive Passage", which issued to Mourray et al. on Jun. 13, 1989; No. 4,817,928, entitled "Suspension System", which issued to Paton on Apr. 4, 1989; No. 4,527,674, entitled "Shock Absorber with a Hydro-mechanical Stop", which issued to Mourray on Jul. 9, 1985; No. 4,962,916, entitled "Compression Spring", which issued to Palinkas on Oct. 16, 1990; and No. 4,756,516, entitled "Resiliently Deformable Element Usable as an End Stop in a Motor Vehicle Suspension", which issued to Tondato on Jul. 12, 1988.

The invention as described hereinabove in the context of the preferred embodiments is not to be taken as limited to all of the provided details thereof, since modifications and variations thereof may be made without departing from the spirit and scope of the invention.

What is claimed is:

1. A suspension system of a motor vehicle, said suspension system comprising:

elastic air springs and at least one compressed air container;

one of said elastic air springs being connected to said at least one compressed air container;

said vehicle having a body and a plurality of wheel suspensions supporting said body;

said plurality of wheel suspensions being connected to said body;

at least one of said elastic air springs having means for connecting to a corresponding one of said wheel suspensions:

said body comprising at least one part;

said at least one part comprising at least one substantially enclosed cavity formed by said at least one part;

said at least one compressed air container being located inside said at least one cavity;

said at least one cavity being disposed a substantial distance away from a substantial portion of said wheel suspensions;

said at least one cavity having at least one wall;

said at least one compressed air container comprising means for contacting said at least one wall of said at least one cavity upon filling of said at least one compressed air container with compressed air;

at least one portion of said at least one wall being disposed to permit the position of said at least one portion to be changed with respect to the rest of said cavity;

said at least one portion comprising an axially movable plate;

a drive mechanism; and said drive mechanism being connected to said movable plate to permit movement of said movable plate and to change the volume of said at least one cavity.

2. The suspension system as claimed in claim 1, wherein said at least one cavity comprises a wheel well dome into which one of said air springs at least partially projects.

3. The suspension system as claimed in claim 2, wherein:

said at least one compressed air container comprises one of a flexible: envelope, sleeve, and capsule; and a pump for providing compressed air to said at least one compressed air container.

4. The suspension system as claimed in claim 3, wherein the flexible envelope has an air connection which is in contact with the wall of the cavity.

5. A method of assembling a suspension system of a motor vehicle, said suspension system comprising air springs and at least one compressed air container; one of said elastic air springs being connected to said at least one compressed air container; and at least one vibration damper;

said vehicle having a body and a plurality of wheel suspensions for supporting said body;

said plurality of wheel suspensions being connected to said body;

said at least one vibration damper having a first end and a second end;

said first end comprising means for attaching said at least one vibration damper to one of said wheel suspensions;

said second end comprising means for attaching said at least one vibration damper to said vehicle body;

one of said elastic air spring and a corresponding one of said vibration dampers comprising an individual unit;

said body comprising at least one part;

said at least one part comprising at least one substantially enclosed cavity formed by said at least one part;

said at least one compressed air container being located inside said at least one cavity;

said at least one cavity being disposed a substantial distance away from a substantial portion of said wheel suspensions;

said cavity having at least one wall;

said at least one compressed air container comprises one of a flexible: envelope, sleeve, and capsule; said at least one compressed air container comprises means for contacting the at least one wall of the cavity upon filling of said at least one compressed air container with compressed air:

said method comprising:

providing at least one cavity in at least one body part of a motor vehicle;

providing one of a flexible: envelope, sleeve, and capsule for containing compressed air;

said at least one cavity for receiving said flexible envelope or sleeve or capsule;

said at least one cavity having an opening for receiving one of said flexible: envelope, sleeve, and capsule into said opening;

said method further comprising:

introducing one of said flexible: envelope, sleeve, and capsule into said opening;

positioning one of said flexible: envelope, sleeve, and capsule in the cavity;

filling one of said flexible: envelope, sleeve, and capsule with compressed air; and closing the opening for receiving one of said flexible: envelope, sleeve, and capsule.

6. Method as claimed in claim 5, wherein the envelope or sleeve or capsule is folded flat and connected to a flexible assembly rod, and the envelope or sleeve or capsule is introduced into the opening by means of the assembly rod.

7. Method as claimed in claim 6, wherein the opening is closed by a cover which is located inside the cavity, the closing force on which is the pressure inside the compressed air container.

8. A suspension system of a motor vehicle, said suspension system comprising:

said vehicle having a body and a plurality of wheel suspensions supporting said body;

said plurality of wheel suspensions being connected to said body;

at least one vibration damper having a first end and a second end;

said first end comprising means for attaching said vibration damper to a corresponding one of said wheel suspensions;

said second end comprising means for attaching said vibration damper to said vehicle body;

elastic air springs and at least one compressed air container;

at least one of said elastic air springs being connected to said at least one compressed air container;

one of said elastic air springs and a corresponding one of said vibration dampers comprising an individual unit;

said vehicle body comprising at least one part;

said at least one part comprising at least one substantially enclosed cavity formed by said at least one part;

said at least one compressed air container being located inside said at least one cavity; and said at least one cavity being disposed a substantial distance away from a substantial portion of said wheel suspensions.

9. The suspension system as claimed in claim 8, wherein said at least one cavity comprises a wheel well dome into which one of said air springs at least partially projects.

10. The suspension system as claimed in claim 9, wherein:

said at least one cavity has a least one wall;

said at least one compressed air container comprises one of a flexible: envelope, sleeve, and capsule;

said at least one compressed air container comprises means for contacting said at least one wall of said at least one cavity upon filling of said at least one compressed air container with compressed air; and said suspension system further comprises a pump for providing compressed air to said at least one compressed air container.

11. The suspension system as claimed in claim 10, wherein:

said at least one compressed air container comprises said flexible envelope; and said flexible envelope is multilayered.

12. The suspension system as claimed in claim 11, wherein at least one part of said wall which forms said at least one cavity is realized so that its position can be changed in relation to the rest of said wall.

13. The suspension system as claimed in claim 12, wherein the part of the wall is formed by an axially movable plate.

14. The suspension system as claimed in claim 13, wherein the axially movable plate has a drive mechanism to change the volume of the cavity.

15. The suspension system as claimed in claim 14, wherein the flexible envelope has an air connection which is in contact with the wall of the cavity.

16. The suspension system as claimed in claim 8, wherein said at least one part comprises one of a frame member of said body and a portion of a superstructure of said vehicle body.

17. The suspension system as claimed in claim 16 wherein said frame member comprises a frame crossmember.

18. The suspension system as claimed in claim 16, wherein said frame member comprises a frame crossmember having a partition which divides said compressed air container in a sealed manner into two individual reservoirs.

19. The suspension system as claimed in claim 16, wherein said frame member comprises a frame crossmember having two partitions which divide said compressed air container in a sealed manner, into one main reservoir and two supplemental reservoirs.

20. The suspension system as claimed in claim 19, wherein the partitions have switchable connecting valves between the supplemental reservoirs and the main reservoir.

* * * * *